(12) United States Patent
Barnes et al.

(10) Patent No.: US 8,905,072 B2
(45) Date of Patent: Dec. 9, 2014

(54) MANUAL OVERRIDE DEVICE FOR A TWIN SPOOL VALVE

(75) Inventors: Michael Stanley Barnes, Cheltenham (GB); Evan Kyle Artis, St. Louis Park, MN (US); Nachiket Pandurang Honkalse, Pune (IN)

(73) Assignee: Eaton Limited, Hampshire (GB)

( * ) Notice: Subject to any disclaimer, the term of this patent is extended or adjusted under 35 U.S.C. 154(b) by 185 days.

(21) Appl. No.: 13/214,304

(22) Filed: Aug. 22, 2011

(65) Prior Publication Data
US 2013/0048893 A1 Feb. 28, 2013

(51) Int. Cl.
| | | |
|---|---|---|
| *F15B 13/043* | (2006.01) | |
| *F16K 31/14* | (2006.01) | |
| *F16K 27/00* | (2006.01) | |
| *F16K 31/60* | (2006.01) | |
| *F15B 13/04* | (2006.01) | |

(52) U.S. Cl.
CPC .............. *F16K 31/60* (2013.01); *F16K 27/003* (2013.01); *F16K 31/14* (2013.01); *F15B 13/0402* (2013.01)
USPC ........................... 137/596.16; 251/14; 251/78

(58) Field of Classification Search
USPC ........ 137/596–596.2; 251/12–14, 18, 129.03, 251/78
See application file for complete search history.

(56) References Cited

U.S. PATENT DOCUMENTS

| | | | | |
|---|---|---|---|---|
| 80,461 | A * | 7/1868 | Davis | 137/489.5 |
| 670,250 | A * | 3/1901 | Ryan | 251/14 |
| 3,646,959 | A * | 3/1972 | Connett et al. | 137/596.12 |
| 4,011,891 | A * | 3/1977 | Knutson et al. | 137/625.62 |
| 4,017,053 | A * | 4/1977 | Wells et al. | 251/58 |
| 4,071,046 | A * | 1/1978 | Cates | 137/596.15 |
| 4,360,239 | A * | 11/1982 | Boehringer | 303/117.1 |
| 4,627,468 | A * | 12/1986 | Wilke et al. | 137/625.66 |
| 4,827,982 | A * | 5/1989 | Inagaki | 137/636.1 |
| 5,209,263 | A * | 5/1993 | Hori | 137/636.2 |

\* cited by examiner

*Primary Examiner* — John Rivell
*Assistant Examiner* — Seth W MacKay-Smith
(74) *Attorney, Agent, or Firm* — Leydig, Voit & Mayer, Ltd.

(57) ABSTRACT

A manual override device for controlling at least one valve in a power system includes a rod having a first end and a second end. An attachment is configured to attach to a spool of the at least one valve and includes a clearance with respect to the first end of the rod so as to allow the attachment to move with the spool, during ordinary operation of the power system, without contacting the rod. A lever is connected to the second end of the rod and is configured to activate the manual override device by moving the rod in a longitudinal direction such that the first end of the rod makes contact with the attachment to move the spool.

13 Claims, 12 Drawing Sheets

MANUAL OVERRIDE DEVICE FOR A TWIN SPOOL VALVE

FIELD

The present invention relates generally to a manual override device and more particularly to a manual override device for use in a twin spool valve arrangement.

BACKGROUND

In emergency situations, hydraulic and other power systems require a manual override of valve positions. FIG. 1 shows an example of a manual override device 10 for changing the positions of spools 12 so as to provide different flows and pressures through first and second ports 16 and 17. A first end 21 of an extension rod 20 is securely attached within a channel 13 of the spool 12 and a reduced diameter section 23 and a ball end 25 are provided at the second end 22 of the rod 20 for connection to a lever 14. The lever 14 is can be moved to manually change the positions of the spools 12. A seal housing 30 attached to the body 32 of the hydraulic power system beneath each spool 12 retains a conical spring 28 that is biased against the spool 12. The rod 20 passes through the seals 26 of the housing 30. During ordinary operation (as used herein, ordinary operation means under normal operating conditions in which no manual override is active) of the hydraulic power system 1 shown in FIG. 1, the rods 20 move together with the spools 12 and therefore also move with respect to the surrounding seals 26 and the lever 14.

SUMMARY

In an embodiment, the present invention provides a manual override device for controlling at least one valve in a power system including a rod having a first end and a second end. An attachment is configured to attach to a spool of the at least one valve and includes a clearance with respect to the first end of the rod so as to allow the attachment to move with the spool, during ordinary operation of the power system, without contacting the rod. A lever is connected to the second end of the rod and is configured to activate the manual override device by moving the rod in a longitudinal direction such that the first end of the rod makes contact with the attachment to move the spool.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
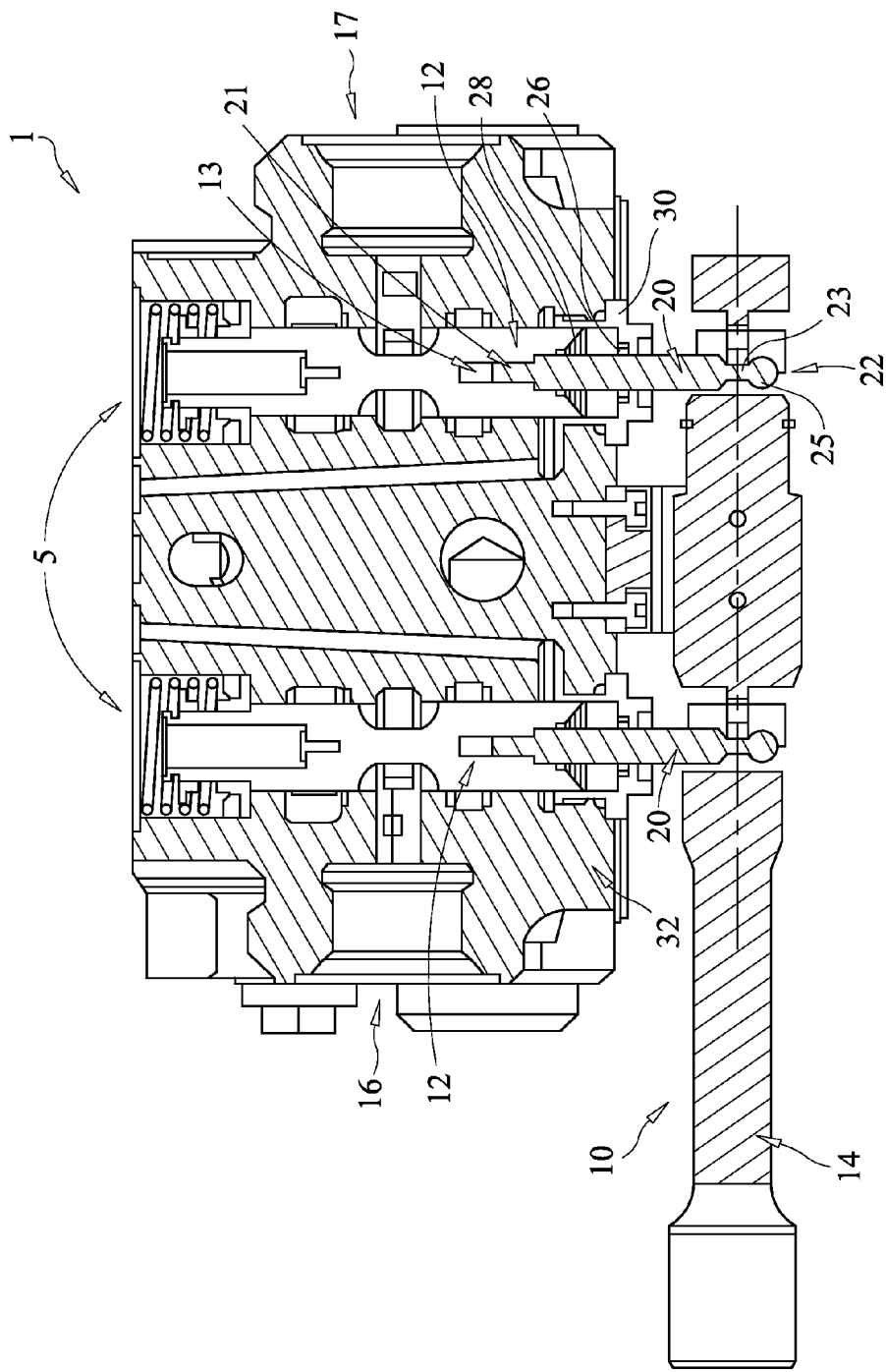
FIG. 1 is a sectional view of a manual override device according to the prior art.

Applicants have discovered that movement of the rods 20, which occurs, for example, in the power system 1 shown in FIG. 1 can result in a significantly decreased life of the manual override device 10. Specifically, due to the magnitude of forces involved, cycle speed and tolerances of parts, Applicants have found that eccentricities and geometry variances result between the spool 12 and the rod 20, between the seals 26 and the housing 30 and between the housing 30 and its attachment location to the body 32. Because these parts are not concentric, or have geometry variances, radial forces between the parts result which can significantly decrease the cycle life of the manual override device 10 and which can also result in increased friction forces which, for example, must be overcome when operating the lever 14 to activate manual override. Moreover, because rod 20 also moves with respect to the lever 14 and the seals 26, there is a significant risk of leakage from the housing 30 or that dirt or other unwanted materials may get caught and likewise increase the friction forces. For example, a dirt ingress could form at the interface between the lever 14 and the rod 20 which could make it difficult to activate manual override (in which the lever 14 must first be moved to engage the rods 20) in an emergency situation when it is needed, thereby rendering the manual override device 10 unsafe. Further, because the rod 20 moves together with the spools 12 during ordinary operation, these problems also have been found to adversely affect the free movement of the spools 12, and therefore adversely affect the operation of the valves 5 during ordinary operation. For example, the above-described radial forces present also interfere with the free movement of the spools 12.

Figure 2:
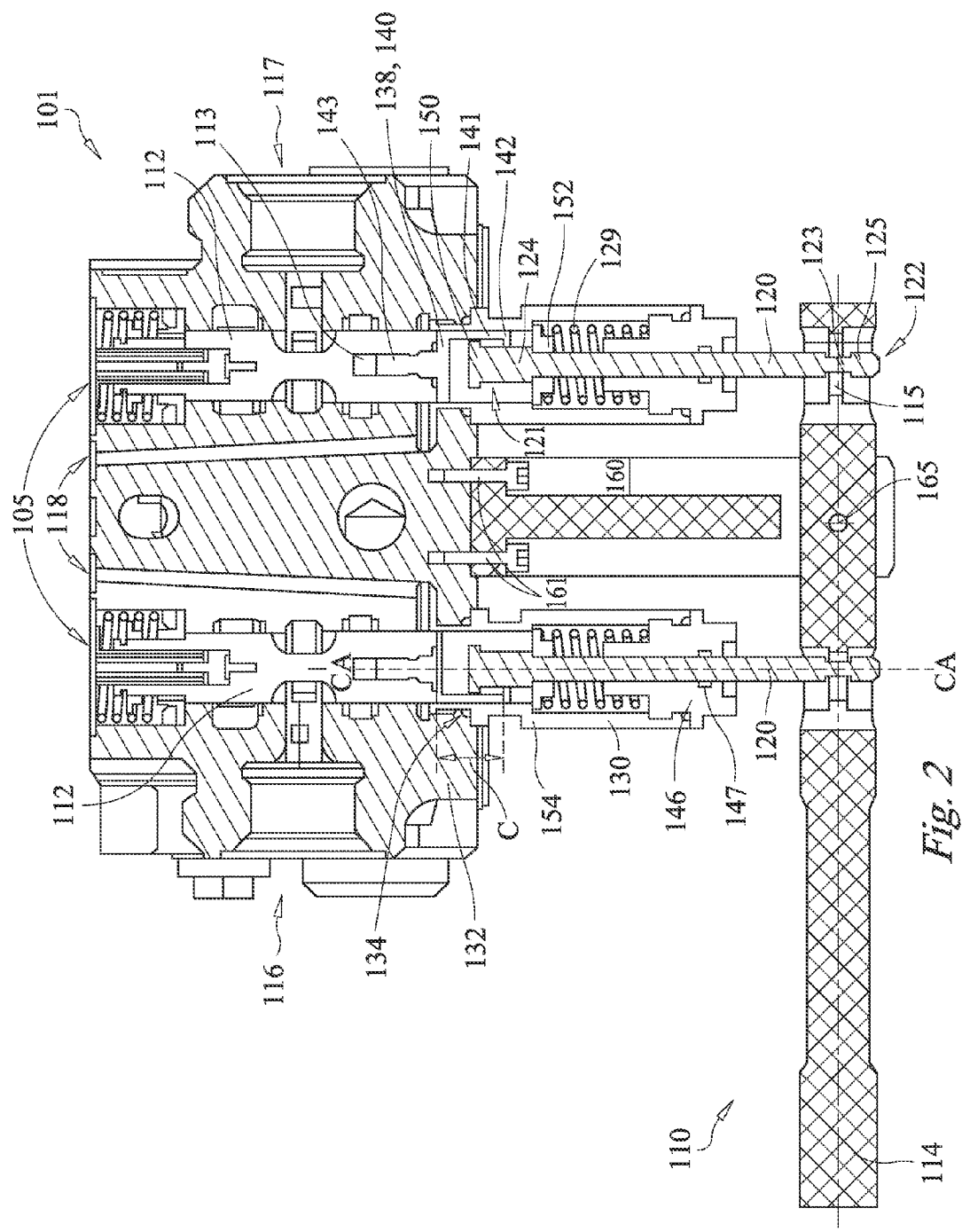
FIG. 2 is a sectional view of a manual override device according to an embodiment of the present invention.

Referring to FIG. 2, an improved manual override device 110 according to an embodiment of the present invention is shown. The manual override device 110 can be assembled to override and control the valves 105 of a hydraulic power system 101 or another system having an electronically controlled valve system. Specifically, the valves 105 are regulated by the independently-controlled movement of spools 112 with respect to first and second ports 116, 117 so as to control flow and pressure provided to or from outputs 118 of the electronically controlled valve system. In an embodiment, the power system 101 can be a 4-landed, 3-port valve hydraulic power control system, for use, for example, in construction equipment and the first and second ports 116, 117 can be, for example, ports of a closed loop electro-hydraulic control valve which controls flow and pressure to and from a tank or can be service ports.

The manual override device 110 is assembled to the body 132 of the power system 101 at mounts 134 disposed beneath spools 112 as will be described in further detail below with respect to FIGS. 6-15. As discussed above, the spools 112 control the flow and pressure through ports 116, 117 by moving in a longitudinal direction extending along a central axis CA transverse to the ports 116, 117. The mounts 134 are provided below the spools 112 in the longitudinal direction and are preferably concentric to the central axis CA.

A housing 130 including a plug end 146 of the manual override device 110 is disposed within each mount 134. A rod 120 extends centrally through the housing 130 and out of the plug end 146 which includes a sealing ring 147. At a first end 121 of the rod 120 is an enlarged diameter section 124 and an extension 150 and at a second end 122 of the rod 120 is a reduced diameter section 123 and a ball end 125. A lever 114 for activating the manual override device is attached at the second ends 122 of the rods 120 by slots 115. The lever 114 is rotationally attached at a fulcrum 165 via a bracket 160 extending from and connected to the body 132. A spring 129, which is preferably a cylindrical spring, is disposed within the housing 130 between the plug end 146 and a stop collar 152 which in turn abuts against a shoulder 154 of the housing 130. The stop collar 152 is disposed below the enlarged diameter section 124 of the rod 120. Preferably, each of the rod 120, spring 129, housing 130, plug end 146 and stop collar 152 are disposed concentrically about the central axis CA of the spools 112.

Likewise disposed concentrically about the central axis CA in the longitudinal direction (defined herein as the direction extending in or parallel to the central axis CA) is an attachment 138, which in the embodiment shown is a cutaway receptacle 140, that is attached within a channel 113 extending concentrically along the central axis CA of each spool 112. In an embodiment, the cutaway receptacle 140 can be configured as a cup having a section cutaway so as to form a semi-circular wall section 141 and a semi-circular lip 142 that extends from the wall section 141 toward the central axis CA.

It has been discovered that it is particularly advantageous, as discussed above, however, if the rod 120 does not move or contact the attachment 138 during ordinary operation so as to provide a "floating" spool. Accordingly, a clearance C is provided which allows full motion of the spools 112 in the longitudinal direction while the lever 114 is in a rest position shown in FIG. 2 (and maintained in the rest position until the lever 114 is activated as described below) without the attachment 138 contacting the rod 120 or vice versa. Further, it is advantageous if there is no radial contact between the attachment 138 and the rod 120. For example, in the embodiment shown, the lip 142 of the cutaway receptacle 140 does not extend all the way to the enlarged diameter section 124 of the rod 120 and the extension 150 of the rod 120 does not extend all the way to the wall section 141 of the cutaway receptacle 140. Accordingly, the attachment 138 can move together without contact, or "float," with the spool 112 such that if any components of the manual override device are not disposed exactly concentrically with the spool 112, the clearance C allows for the eccentricity without introducing radial or friction forces which impede the free movement of the spool 112. Moreover, because the rod 120 is held in its rest position shown in FIG. 2 and does not move during ordinary operation, the manual override device 110 is safer, easier to operate and has a significantly increased cycle life.

In other embodiments, the "floating" spool 112 and the clearance C between an attachment 138 to the spool 112 and a first end 121 of the rod 120 which engages the attachment 138 to the spool 112 only when the manual override device 110 is activated by the lever 114 can have different configurations. For example, the attachment 138 (which in the above-described embodiment is the cutaway receptacle 140) and the first end 121 of the rod 120 can have different shapes so long as the first end 121 of the rod 120 engages the attachment 138 only when the lever 114 is activated from its rest position. In one embodiment, the cutaway receptacle 140 can be disposed at the first end 121 of the rod 120 and the attachment 138 can include the extension 150 configured to engage the lip 142 of the cutaway receptacle 140.

When the power system 101 is controlling the valves 105 under ordinary operation, electronically controlled, hydraulic signal pressure is applied to either end of the spools 112 in order to move the spools 112 back and forth in the longitudinal direction along the central axis CA. This signal pressure acts on the differential area of the rod 120 at the first end 121 and tries to push the rod 120 out of the housing 130. The springs 129 are designed to have a spring force which counteracts a maximum signal pressure load so as to hold the rod 120 in a steady position when the manual override device is not activated. Further, in an embodiment, each spring 129 has the same spring force and is disposed an equal distance from the fulcrum 165 of the lever 114 such that the equal and opposite torques applied by the springs 129 hold the lever 114 in the rest position, as seen in FIG. 2, during ordinary operation.

Figure 3:
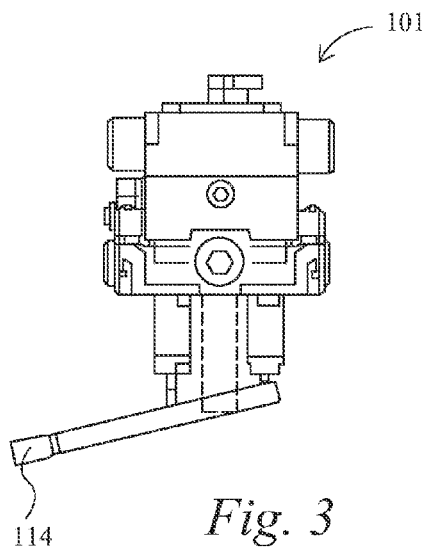
FIG. 3 is a front view of a power system having the manual override device in a first activated position.
Figure 4:
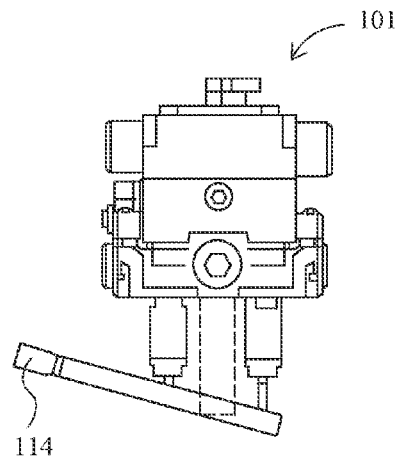
FIG. 4 is a front view of the power system having the manual override device in a second activated position.

When the lever 114 is actuated in a first direction (FIG. 3) or a second direction (FIG. 4) to activate the manual override device 110 (for example, because of a failure of electronics or other emergency situation, or for testing or service), one of the rods 120 is pushed in the longitudinal direction upward and the other, opposite rod 120 of the twin-valve arrangement is pulled in the longitudinal direction downward. One of the springs 129 is compressed by the respective rod 120 being pulled in the longitudinal direction downward by the lever 114, whereby the enlarged diameter section 124 compresses the respective spring 129 via the stop collar 152. The other, opposite spring 129 remains static as the rod 120 slides through the respective spring 129 and the stop collar 152 when the rod 120 is pushed in the longitudinal direction upward by the lever 114. Accordingly, additional spring load is applied only to one side of the lever 114 that is pulled downward in the first direction (FIG. 3) or the second direction (FIG. 4).

Additionally, when one of the rods 120 is pushed in the longitudinal direction upward, this rod 120 engages, at the first end 121, with the cutaway receptacle 140 to move the corresponding spool 112 in the longitudinal direction upward and thereby add or reduce flow and pressure through the first port 116. Conversely, when the other, opposite rod 120 of the twin-valve arrangement is pulled in the longitudinal direction downward, the extension 150 of this rod engages the lip 142 of the cutaway receptacle 140 to move the corresponding spool 112 in the longitudinal direction downward and thereby add or reduce flow and pressure through the second port 117. Moreover, once activated, other and multiple intermediate positions between the positions of the lever 114 shown in FIGS. 3 and 4 are also possible to position the respective spools 112 to provide particular desired responses by the valves 105 of the power system 101. For example, the first port 116 could be a pressure port and the second port 117 could be a fuel port and movement of the lever 114 in the first direction (FIG. 3) or the second direction (FIG. 4) can operate to interchangeably add or remove pressure and open or close a tank.

Figure 5:
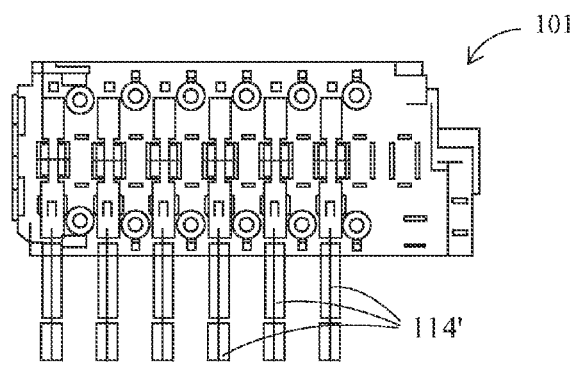
FIG. 5 is a bottom view of the power system showing a bank of the manual override devices in a first activated position.

Referring to FIG. 5, a power system 101 can include a series of twin valve arrangements each having a respective manual override device 110.

Figure 6:
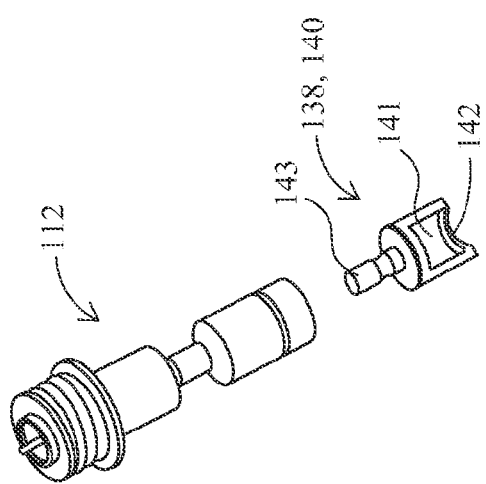
FIG. 6 is an exploded view of a spool and an attachment according to an embodiment of the present invention.
Figure 7:
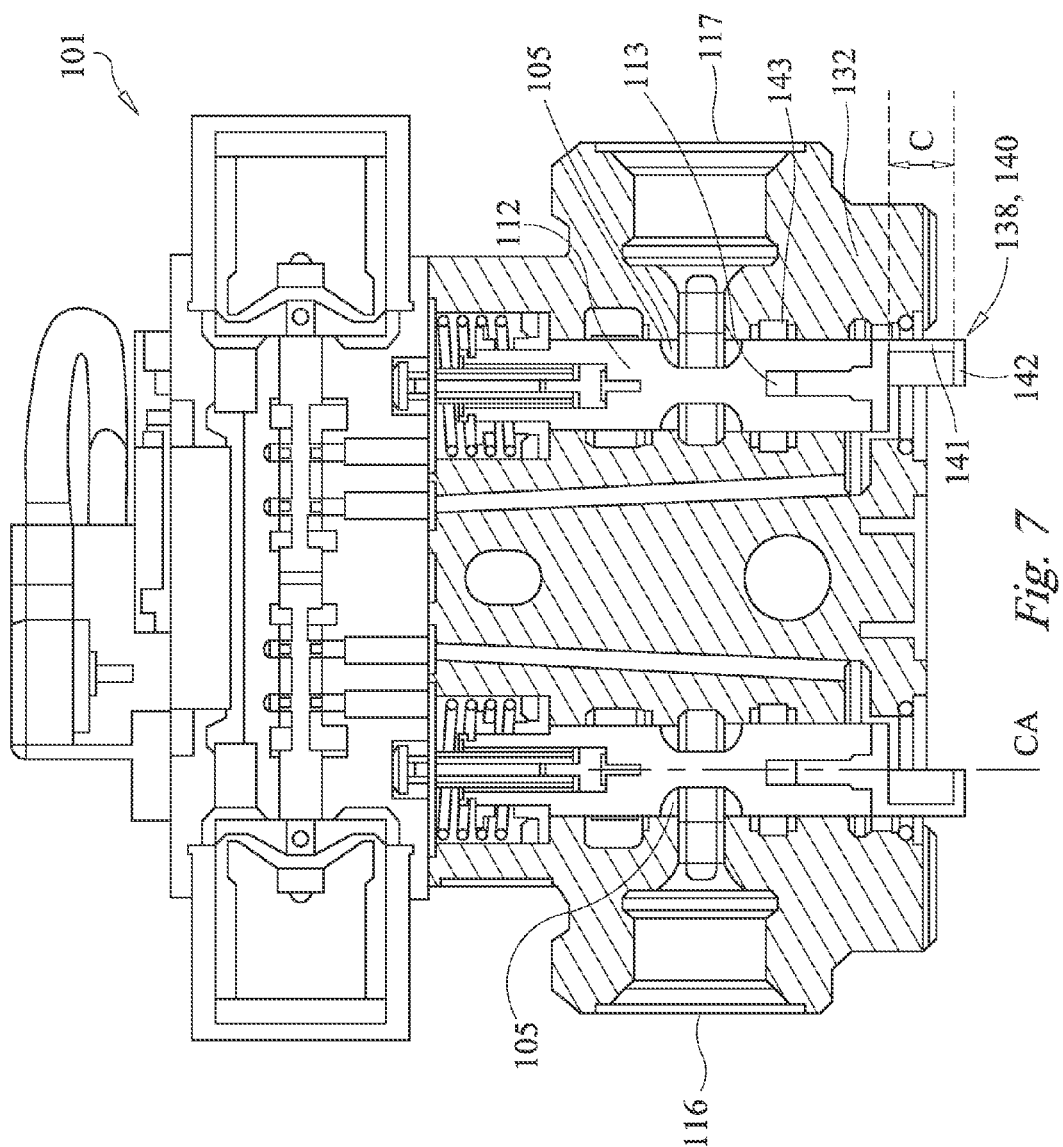
FIG. 7 is a sectional view of a first assembly step of a method according to an embodiment of the present invention.
Figure 8:
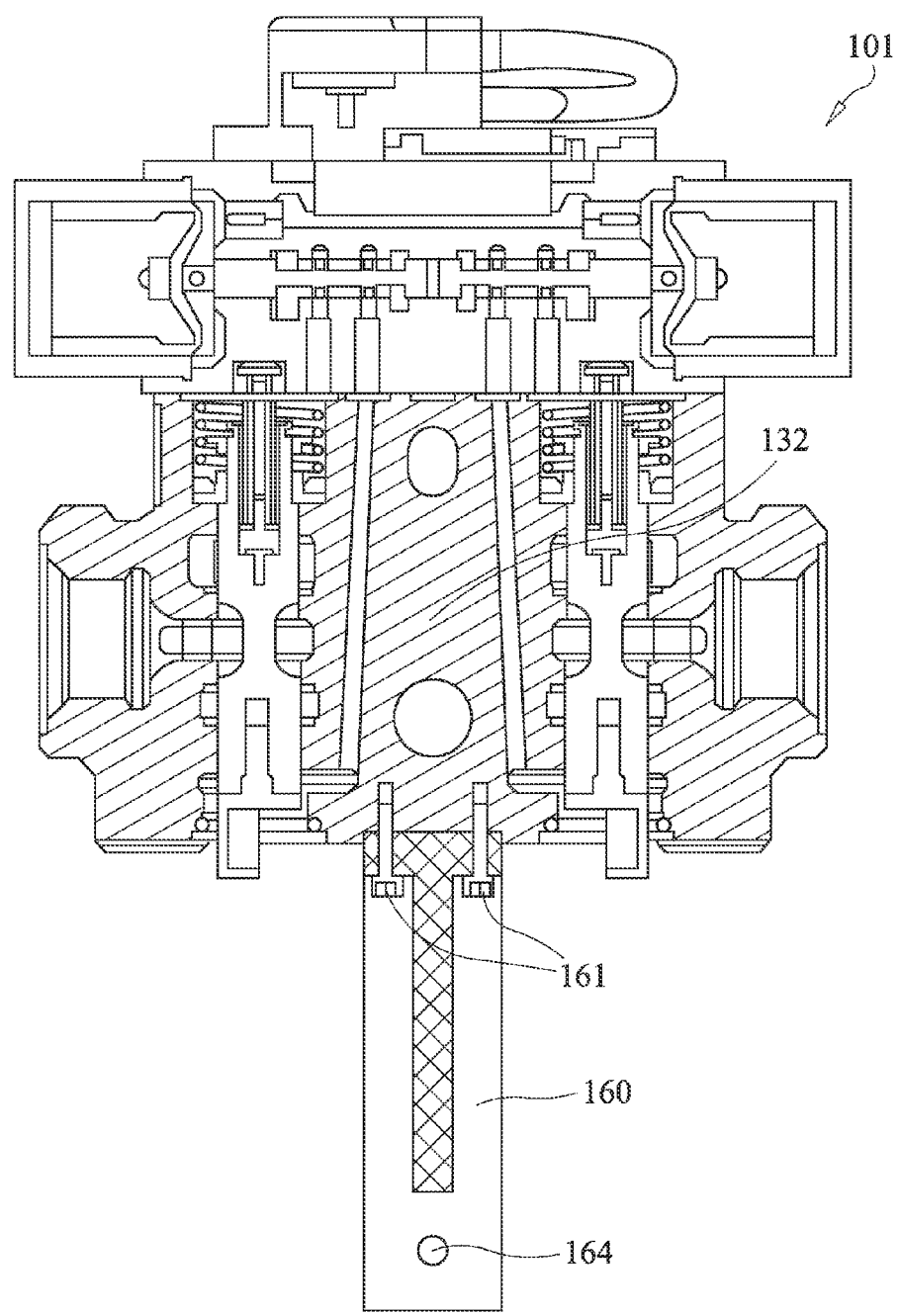
FIG. 8 is a sectional view of a second assembly step of the method.
Figure 9:
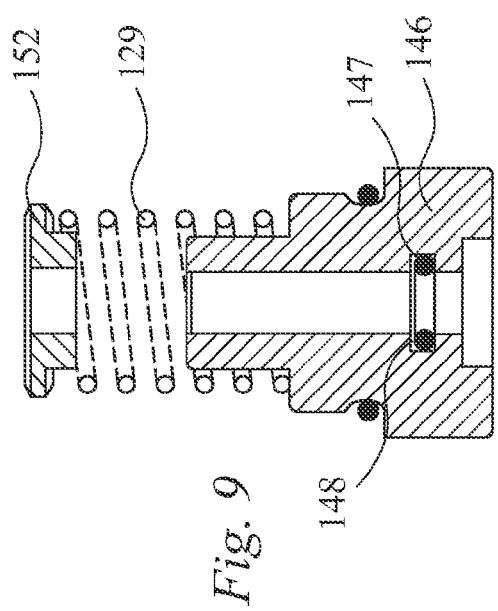
FIG. 9 is a sectional view of a third assembly step of the method.
Figure 10:
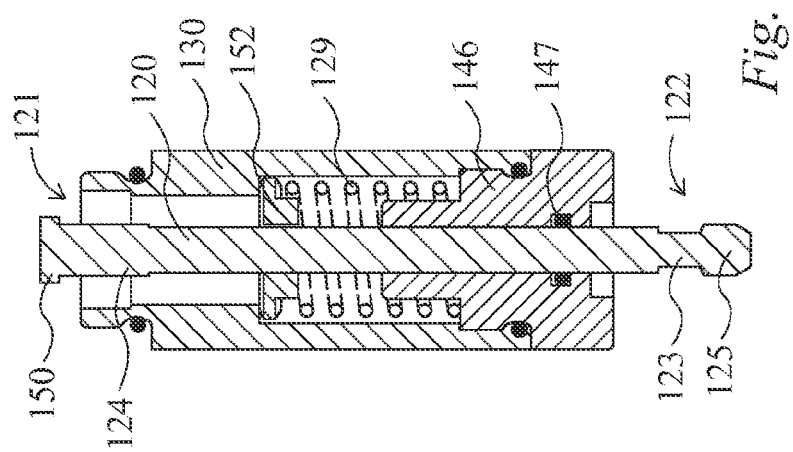
FIG. 10 is a sectional view of a fourth assembly step of the method.
Figure 11:
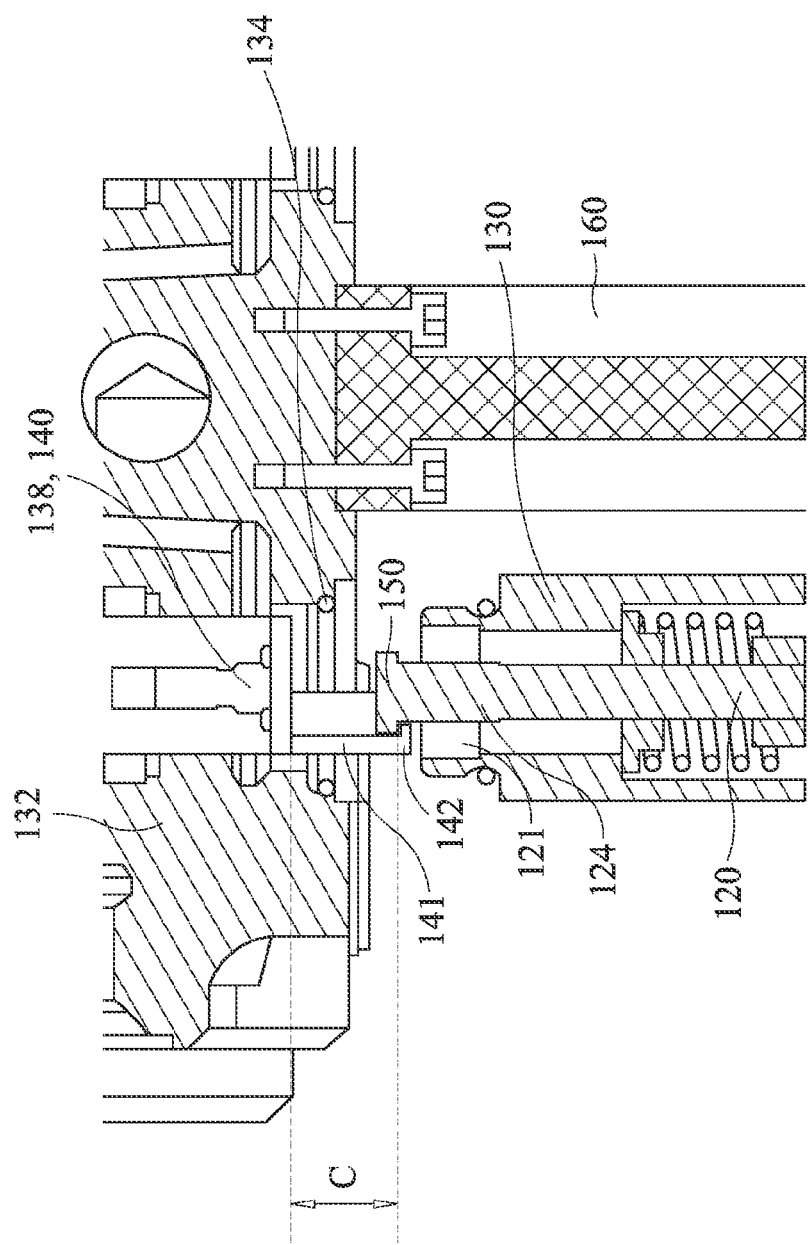
FIG. 11 is a sectional view of a fifth assembly step of the method.
Figure 12:
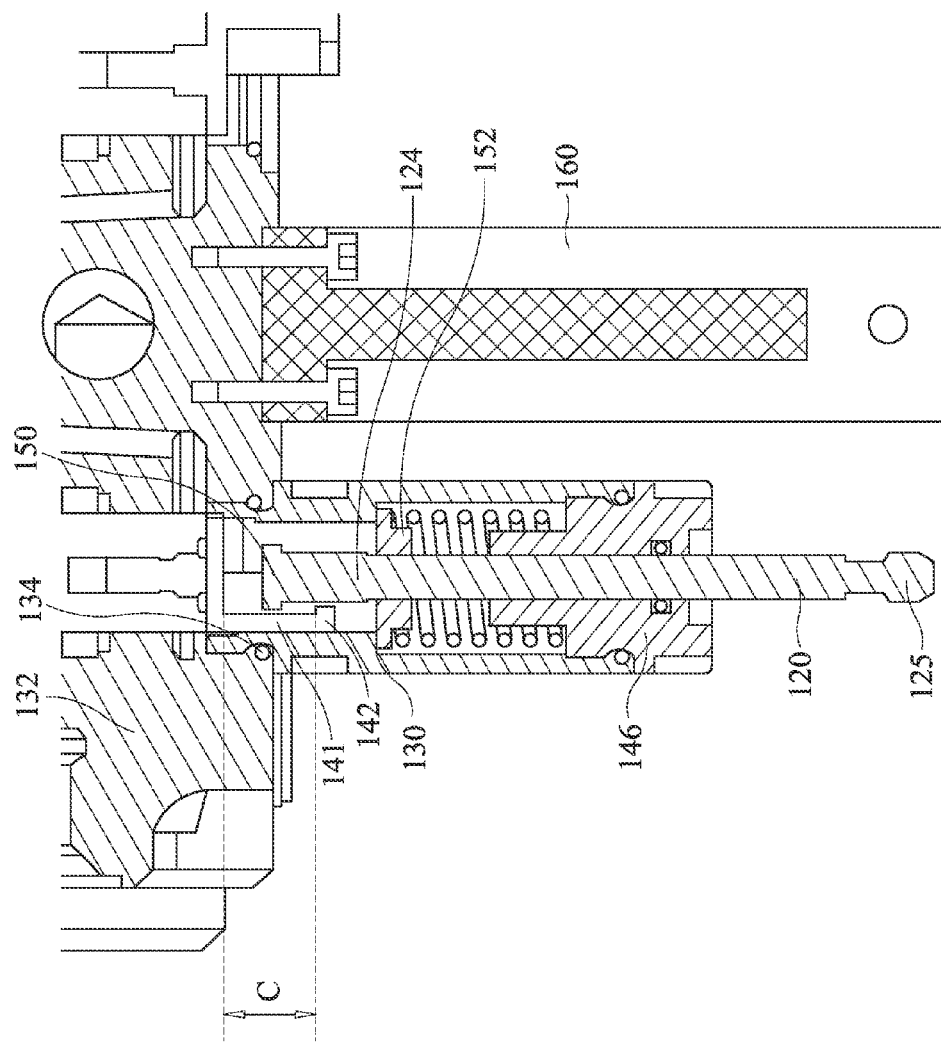
FIG. 12 is a sectional view of a sixth assembly step of the method.
Figure 13:
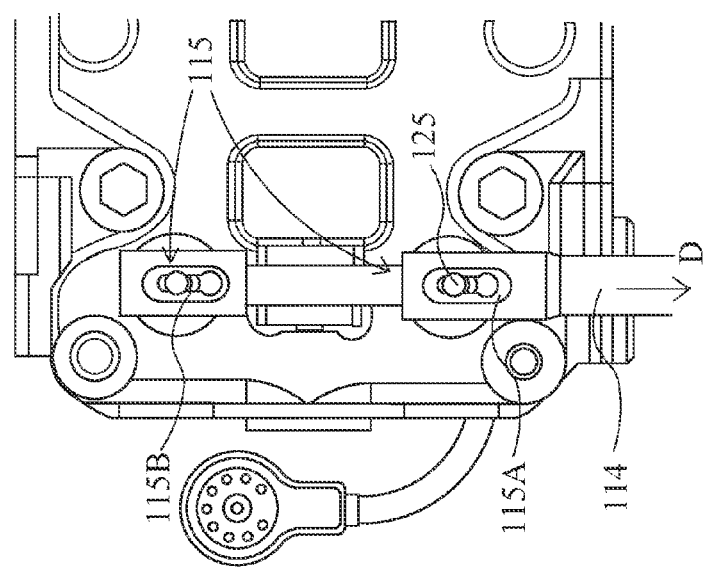
FIGS. 13 and 14 respectively show a bottom view and a sectional view of a seventh assembly step of the method.
Figure 14:
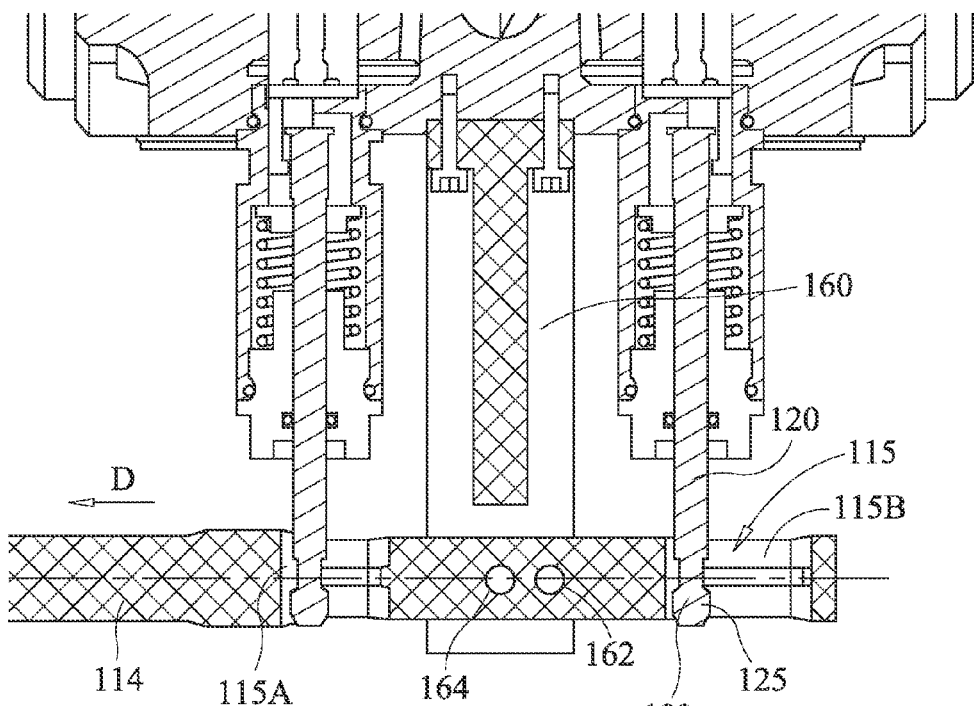
Figure 15:
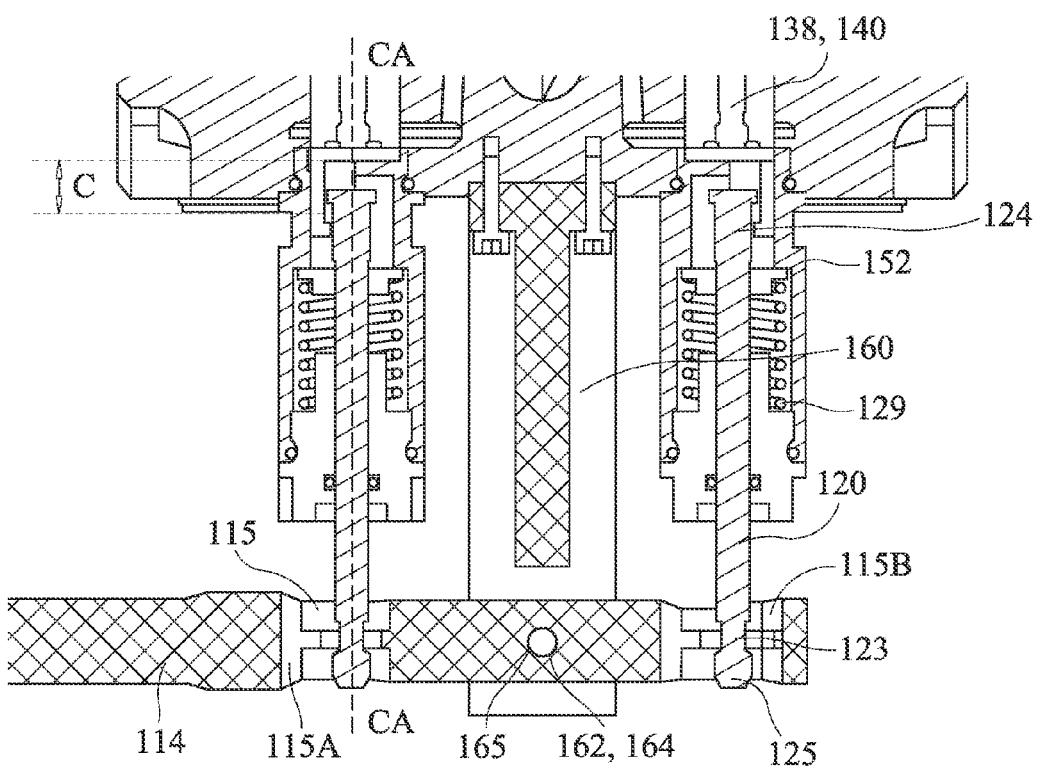
FIG. 15 is a sectional view of an eighth assembly step of the method.

Referring to FIGS. 6-15 an assembly procedure for the manual override device 110 is shown. FIGS. 6 and 7 respectively show the spool 112 and the cutaway receptacle 140 in an unassembled state and the cutaway receptacle 140 being connected in the channel 113 of the spool 112 via the shaft 143, which may be, for example, a threaded connection using a dowel diameter which helps facilitate the concentricity of the cutaway receptacle 140 with the spool 112. FIG. 8 illustrates an assembly step of mounting the bracket 160 to the body 132, for example, via screws 161. FIG. 9 shows a sectional view of the sub-assembly of the plug end 146, the spring 129 and the stop collar 152. Preferably, the plug end 146 is cleaned, a lubricant is applied to a groove 148 of the plug end 146, a sealing ring 147 (e.g., an O-ring) is inserted into the groove 148, the spring 129 is placed on the plug end 146 and the stop collar 152 is placed on the spring 129. FIG. 10 shows an assembly step where the rod 120 is inserted, with the second end 122 first, through the stop collar 152, the spring 129 and the plug end 146 and in which the housing 130 has been connected to the plug end 146, for example by a threaded connection or sealing arrangement. FIG. 11 shows an assembly step wherein the extension 150 of the rod 120 is inserted over the lip 142 of the cutaway receptacle 140 so as to be disposed and operable within the clearance C of the cutaway receptacle 140. Preferably, this step includes making the rod 120 concentric with the cutaway receptacle 140 and the spool 112. Next, as shown in FIG. 12, the housing 130 and plug end 146 are pressed upwards and connected, for example by a threaded connection, into the mount 134. The assembly is repeated for the other valve 105. FIGS. 13 and 14 illustrate an assembly step in which an enlarged section 115A of the slots 115 of the lever 114 are slid through the ball ends 125 of the rods 120 so that the slots 115 line up with the reduced diameter sections 123. Next, as shown by FIGS. 14 and 15, the lever 114 is moved in a direction D transverse to the longitudinal direction such that the reduced diameter sections 123 of the rods 120 are disposed in the reduced section 115B of the slots 115 and so that the lever mounting hole 162 and the bracket mounting hole 164 align at fulcrum 165 where the lever 114 is rotationally attached to the bracket 160, for example, by a pin connection. The slots 115, in the embodiment shown, have a length in the direction D of the lever 114 which allows the rods 120 to slide along the slots 115 in direction D or in the opposite direction in order to maintain the orientation of the rods 120 in the longitudinal direction concentric with the central axis CA when the lever is moved in the first direction (FIG. 3) or the second direction (FIG. 4). The assembly steps shown in FIGS. 6-15 can be performed in different orders and in any number of sub-steps.

While the invention has been particularly shown and described with reference to preferred embodiments thereof, it will be understood by those skilled in the art that various changes in form and details may be made therein without departing from the spirit and scope of the invention. Further, the present invention is not limited to the embodiments described herein; reference should be had to the appended claims.

What is claimed is:

1. A manual override device for controlling at least one valve in a power system, comprising:
   a rod having a first end and a second end;
   an attachment configured to attach to a spool of the at least one valve, the attachment including a clearance with respect to the first end of the rod so as to allow the attachment to move with the spool, during ordinary operation of the power system, without contacting the rod;
   a lever connected to the second end of the rod and configured to activate the manual override device by moving the rod in a longitudinal direction such that the first end of the rod makes contact with the attachment to move the spool;
   a housing configured to attach to a mount of the power system in the longitudinal direction below the spool, the housing including a plug end; and
   a spring disposed on the plug end within the housing and a stop collar disposed over the spring, wherein the rod extends through the housing, the stop collar, the spring and the plug end, and wherein the rod includes an enlarged diameter section at the first end which abuts the stop collar during the ordinary operation of the power system.

2. The manual override device according to claim 1, wherein the attachment includes a cutaway receptacle having a lip and a sidewall and the first end of the rod includes an extension.

3. The manual override device according to claim 2, wherein the extension is disposed along the sidewall between the sidewall and the spool such that the clearance includes a length of the sidewall.

4. The manual override device according to claim 1, wherein a spring force of the spring is greater than a pressure of the power system used to move the spool during the ordinary operation of the power system.

5. A valve control system for a power system comprising:
   a spool configured to move in a longitudinal direction so as to regulate at least one of a flow and a pressure through a port;
   an attachment concentrically attached to the spool;
   a rod having a first end and a second end, the first end being disposed within a clearance of the attachment so as to allow the attachment to move with the spool, during ordinary operation of the power system, without contacting the rod; and
   a lever connected to the second end of the rod and configured to activate a manual override of a position of the spool by moving the rod in a longitudinal direction such that the first end of the rod makes contact with the attachment to move the spool;
   a housing configured to attach to a mount of the power system in the longitudinal direction below the spool, the housing including a plug end; and
   a spring disposed on the plug end within the housing and a stop collar disposed over the spring, wherein the rod extends through the housing, the stop collar, the spring and the plug end, and wherein the rod includes an enlarged diameter section at the first end which abuts the stop collar during the ordinary operation of the power system.

6. The valve control system according to claim 5, wherein the attachment includes a cutaway receptacle having a lip and a sidewall and the first end of the rod includes an extension.

7. The valve control system according to claim 6, wherein the extension is disposed along the sidewall between the sidewall and the spool such that the clearance includes a length of the sidewall.

8. The valve control system according to claim 5, wherein a spring force of the spring is greater than a pressure of the power system used to move the spool during the ordinary operation of the power system.

9. The valve control system according to claim 5, wherein the valve control system includes a twin valve arrangement having two spools, each having the attachment and regulating separate ports, and two rods which attach to the lever on opposite sides of a fulcrum.

10. The valve control system according to claim 5, wherein the power system is a hydraulic power system and the port is at least one of a pressure port, a fuel port and a service port.

11. A method of assembling a manual override device to a body of a power system, comprising:
   connecting an attachment to a spool which moves in a longitudinal direction during ordinary operation of the power system so as to regulate at least one of a flow and a pressure through a port;
   inserting a first end of a rod into a clearance of the attachment so as to be substantially concentric therewith and so that the clearance of the attachment allows the attachment to move with the spool, during the ordinary operation of the power system, without contacting the rod;
   connecting a housing including a plug end, a spring disposed on the plug end and a stop collar disposed on the spring to a mount of the power system such that an enlarged diameter section of the rod at the first end abuts the stop collar; and
   connecting a lever to a second end of the rod such that the rod is movable in the longitudinal direction when the lever is moved in a first direction or a second direction opposite to the first direction so as to activate a manual override of a position of the spool by moving the rod in the longitudinal direction such that the first end of the rod makes contact with the attachment to move the spool.

12. The method according to claim 11, wherein the attachment includes a cutaway receptacle having a lip and a sidewall and the first end of the rod includes an extension.

13. The valve control system according to claim 12, wherein the rod is inserted into the clearance by inserting the extension along the sidewall between the sidewall and the spool.

* * * * *